United States Patent [19]
Fischer

[11] Patent Number: 5,475,826
[45] Date of Patent: Dec. 12, 1995

[54] METHOD FOR PROTECTING A VOLATILE FILE USING A SINGLE HASH

[76] Inventor: Addison M. Fischer, 4073 Merchantile Ave., Naples, Fla. 33942

[21] Appl. No.: 154,520

[22] Filed: Nov. 19, 1993

[51] Int. Cl.$^6$ .............................. G06F 12/00; G06F 3/023
[52] U.S. Cl. ...................... 395/182.04; 395/421.09; 395/421.1; 395/600; 395/421.06; 364/DIG. 1; 364/246.6; 364/252.5; 364/255.1
[58] Field of Search .................................. 395/600, 400, 395/421.06, 421.09, 421.10; 364/DIG. 1

[56] References Cited

U.S. PATENT DOCUMENTS

| | | | |
|---|---|---|---|
| 4,290,105 | 9/1981 | Cichelli et al. | 364/200 |
| 4,352,952 | 10/1982 | Boone et al. | 178/22.09 |
| 4,588,991 | 5/1991 | Atalla | 340/825.31 |
| 5,182,799 | 1/1993 | Tamura et al. | 395/400 |
| 5,199,073 | 3/1993 | Scott | 380/49 |
| 5,204,966 | 4/1993 | Wittenberg et al. | 395/800 |
| 5,208,853 | 5/1993 | Armbruster et al. | 380/4 |
| 5,267,313 | 11/1993 | Hirata | 380/21 |
| 5,297,208 | 3/1994 | Schlafly et al. | 380/49 |
| 5,319,712 | 7/1994 | Finkelstein et al. | 380/44 |

*Primary Examiner*—Thomas G. Black
*Assistant Examiner*—Jean R. Homere
*Attorney, Agent, or Firm*—Nixon & Vanderhye

[57] ABSTRACT

The present invention permits the hash of a file to be taken on an incremental basis. It permits any part of the file to be changed while allowing a new aggregate hash to be computed based on the revised file portion and the prior total hash. The aggregate has is readily updated with each record revision without having to recompute the hash of the entire file in accordance with conventional techniques. These objectives are accomplished using two functions. The first function is an effective one-way hash function "H" for which it is computationally impossible to find two data values that hash to the same result. The second function is a commutative and associative function "F" (and inverse "Finv") and provides a mechanism for combining the aggregate hash and the hash of updated records. Examples of these latter functions include exclusive OR ("XOR") and arithmetic addition. The hash of each file record and the has of an identification of the record (i.e., a record number or key) are combined using a function ("F") whereby individual records may be extracted using the inverse of that function (Finv). In this fashion, an individual record may be extracted from the aggregate hash and updated. Each record is represented by its identification hashed together with its data content. All such record hashs are added together to provide a highly secure integrity check. This aggregate hash covers the entire database such that the tampering (or rearranging) of any data record is revealed by the use of the record identifier (i.e., record number) in the hash calculation due to its impact on the aggregate hash (e.g., the sum).

13 Claims, 4 Drawing Sheets

METHOD FOR PROTECTING A VOLATILE FILE USING A SINGLE HASH

FIELD OF THE INVENTION

This invention generally relates to computer data security. More particularly, it relates to methodology for generating the hash of a file which is periodically updated.

BACKGROUND AND SUMMARY OF THE INVENTION

Particularly, with the advent of electronic business transactions, ensuring the privacy and integrity of workstation data (whether it is generated by a laptop computer, a mainframe terminal, a stand-alone PC, or any type of computer network workstation), is critically important. For example, many users of laptop computers encrypt all hard drive data to ensure data privacy. The encryption hides the data from unintended disclosure.

In and of itself, the encryption does not ensure data integrity. For example, encryption does not prevent an opponent that can gain surreptitious access to the computer from running a special sabotage program which—although being unable to make sense of a particular piece of encrypted data—may attempt to randomly over-write the encrypted data with other possibly random information, thereby causing an erroneous analysis when the data is eventually decrypted for input to other processes.

Depending on the encryption protocol, the type of file that was damaged, and how it was damaged, it is possible that this alteration may go undetected and lead to fallacious results when the data is processed by the proper owner. It is especially easy for this to occur, for example, if the damaged data contains binary numerical dam. The owner may be led to erroneous action by incorrect results.

It is well-known that file integrity may be protected by taking a one-way hash (e.g., by using MD5 or the secure hash algorithm SHA) over the contents of the file. By implementing and checking a currently computed hash value, with a previously stored hash value, correct file integrity assures the threat of malicious tampering (or even accidental external modification) can be detected—thereby improving the reliability and security of ultimate results. Assuming it is stored in a way that preserves its own integrity, the file hash can be used to insure that the entire file has not been damaged or deliberately tampered.

Such a hash can be computed when the file is processed sequentially. The hash can be computed when (or as) the file is sequentially built; and then checked again whenever the file is used. Provided that the hash value is protected from alteration—such as by being encrypted by a key known only to the user, or by being digitally signed in a way trusted by the user, or by being stored in a trusted token device, the user can be certain that the file has not been altered, since modification of any part of the file will result in the recomputation of a different hash value.

Existing techniques require that the entire file be processed sequentially in order to compute, or re-compute the hash value. These techniques become cumbersome, if not impractical, for files which are frequently updated or which are processed "randomly".

The conventional validation process consists of verifying the hash when the file is first accessed, modifying the file, then re-computing the hash of the revised file after all changes have been applied. This conventional process is not well suited to certain applications such as those which are long-running, or those in which the file is frequently modified, or is in use constantly, or in which there is a danger that the particular program or computer system updating the filed may be interrupted (e.g., the computer may be turned off) anytime before the program comes to final conclusion where the updated file is saved and the new hash is re-computed and stored. This is because it is generally impractical to recompute the hash for the entire file whenever an update occurs. Without such a computation, the file exists in an apparently tampered state between the moment the first update is done, until the final hash is recomputed.

Such practical problems exist when applying conventional hashing techniques to certain types of files. Some files, such as indexed databases, are updated "randomly" (i.e., only a subset of records are updated in some non-sequential order) and over a long period of time. The file may be constantly updated over a period of minutes, hours, or (in the case of mainframes or "servers") even days.

If the hash is computed over the entire file and the file is frequently updated, then computing a revised hash over the entire file each time it is modified results in unacceptable overhead. On the other hand, if the hash is computed over the entire file and the filed is frequently updated, then delaying the computation of the revised file hash until the file is closed (or the program is completed) results in the file being left in an apparent "incorrect" state between the moment of the first update and the final hash recomputation. If the system or other program is terminated prematurely, then the file is left in this apparent state.

If a hash is maintained for each record, then additional record space is required which may impact the layout of the file or its records. Typically each record's hash might be stored in space set aside at the end of each record. Such file layout revision may be acceptable in some applications, however, this approach suffers various drawbacks including that it requires additional storage for each record.

Another drawback to keeping a hash only on a record-by-record basis is that if an adversary has a stale copy of the database (even if the database was encrypted) and is able to isolate such stale records. Such a database which is designed to be updated "randomly" must be encrypted in record units—cipher chaining across record boundaries makes "random" updating impossible. The adversary could then blindly substitute these anachronistic records for corresponding records in the current active copy of the database (this could be done even if the adversary is unsure of the actual content of the records and only wishes to cause confusion)—thereby damaging the integrity of the database in a way impossible to automatically detect.

The present invention is directed to a novel way to hash the contents of a file so that an ongoing hash may be maintained, and constantly updated, in an efficient fashion. Data base integrity can be maintained without introducing the undue and excessive additional overhead of repeatedly re-processing the entire file, and without leaving the file in an apparently-tampered state for long durations of time (such as while a long-duration real-time program is running).

The invention only requires a limited amount of additional storage for each File, which could easily be maintained in the system directory, or in a special ancillary (and possibly encrypted) file, with other information about each file. The invention allows each underlying file format and structure to be unchanged, and therefore provides integrity "transparently" as part of file processing, possibly at or near the "system" level, without requiring changes to existing programs. This overcomes compatibility difficulties in systems which attempt to provide this additional integrity service as a transparent service in additional to normal operation (independently of any particular application).

The methodology of the present invention permits an insecure computing system to safely perform high security electronic financial transactions. As will be explained in detail herein, the present invention permits the hash of a file to be taken on an incremental basis. It permits any part of the file to be changed while allowing a new aggregate hash to be computed based on the revised file portion and the prior total hash. In accordance with the present invention, the aggregate hash is readily updatable with each record revision without having to recompute the hash of the entire file in accordance with conventional techniques.

The illustrative embodiment accomplishes these objectives using two functions. The first function is an effective one-way hash function "H" for which it is computationally impossible to find two data values that hash to the same result. Examples of such functions include the well-known MD5 and SHA algorithms. The second function is a commutative and associative function "F" (and inverse "Finv") and provides a mechanism for combining the aggregate hash and the hash of updated records. Examples of these latter functions include exclusive OR ("XOR"), and arithmetic addition.

The methodology involves combining the hash of each file record and the hash of an identification of the record (i.e., a record number or key). These hashes are combined using a function ("F") whereby individual records may be extracted using the inverse of that function (Finv). In this fashion, an individual record many be extracted from the aggregate hash and updated. With each update, the file hash as computed according to this invention is preferably also written after being encrypted under a key known only to the valid user, or if it is digitally signed by the valid user or if it is held in a tamper resistant storage. Each record is represented by its identification hashed together with its data content. All such records are added together to provide a highly secure integrity check. This aggregate hash reflects the entire database such that the tampering (or rearranging) of any data record is revealed by the use of the record identifier (i.e., record number) in the hash calculation due to its impact on the aggregate hash (e.g., the sum). Using this methodology a user cannot be tricked into operating with fallacious data.

The invention advantageously overcomes at least the prior art drawbacks of massive re-computation for each file alteration, long periods in which the file is in jeopardy of being considered "invalid" if the application or system is abruptly terminated, additional storage space for a hash (or MAC) for each record, and the ability of an adversary to substitute stale records because the integrity of the entire file, and the inter-relationship of all records is maintained encapsulated in a single file HASH value which changes as each file update is performed.

BRIEF DESCRIPTION OF THE DRAWINGS

These as well as other features of this invention will be better appreciated by reading the following description of the preferred embodiment of the present invention taking in conjunction with the accompanying drawings of which.

DETAILED DESCRIPTION OF THE PRESENTLY PREFERRED EMBODIMENT

Figure 1:
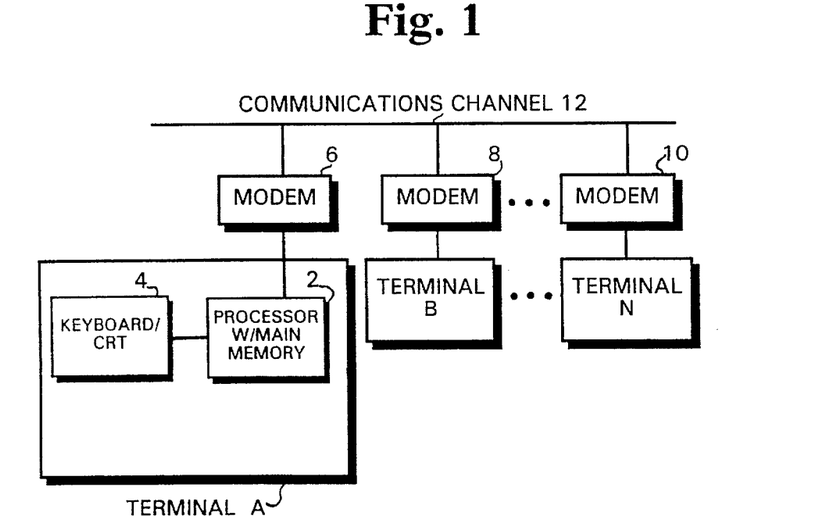
FIG. 1 is a block diagram of a communications system within which the present invention may be utilized.

FIG. 1 shows in block diagram form an exemplary computing system within which the present invention may be utilized as part of an electronic commerce computing network. While the present invention may be used in such a communications network environment, the invention may likewise be advantageously utilized in conjunction with a laptop computer, a stand alone PC, a mainframe computer, or any other computer system where data security is significant.

The system shown in FIG. 1 includes an exemplary computing network having an unsecured communications channel 12 over which communications between terminals A, B, . . . N may take place. Communications channel 12 may, for example, be a telephone line. Terminals A, B through N may, by way of example only, be IBM PC's having a processor (with main memory) 2 which is coupled to a conventional keyboard/CRT 4. Each terminal A, B through N also includes a conventional IBM PC communications board (not shown) which when coupled to a conventional modem 6, 8, 10, respectively, permits the terminals to transmit and receive messages. Each terminal includes a conventional IBM PC disk storage device which permits the computer to read, write and store data base information.

Each terminal is capable of generating a plain text or unenciphered message and performing whatever signature operation may be required, and transmitting the message to any of the other terminals connected to communications channel 12 (or to a communications network (not shown) which may be connected to communications channel 12). Additionally, each of the terminals A, B, through N is capable of performing signature verification on each message.

Each of the terminal users has a public encrypting key and an associated private secret decrypting key. In the public key cryptosystem shown in FIG. 1 each terminal user is aware of the general method by which the other terminal users encrypt a message. Additionally, each terminal user is aware of the encryption key utilized by the terminal's encryption procedure to generate the enciphered message.

Each terminal user, however, by revealing his encryption procedure and encryption key does not reveal his private decryption key which is necessary to decrypt the ciphered message and to create signatures. In this regard it is computationally unfeasible to compute the decryption key from knowledge of the encryption key.

Besides the capability of transmitting a private message, each terminal user likewise has the capability of digitally signing a transmitted message. A message may be digitally signed by a terminal user decrypting a message with his private decrypting key before transmitting the message. Upon receiving the message, the recipient can read the message by using the sender's public encryption key. In this fashion, the recipient can verify that only the holder of the secret decryption key should have created the message. Thus, the recipient of the signed message has proof that the message originated from the sender.

Further details of the exemplary digital signature methodology which may be used in conjunction of the present invention is disclosed in U.S. Pat. No. 4,405,829, and the applicant's digital signature methodology disclosed in U.S. Pat. Nos. 4,868,877 and 5,005,200, which patents are hereby expressly incorporated.

Each of the computer terminals A to N are preferably designed to be a secure workstations for electronic commerce. In accordance with the present invention, the entire memory space of a computer terminal may be protected in a manner described in detail below or if desired only a portion of the memory space may be protected. Each of the programs resident in the terminal memory space is preferably protected in accordance with program authorization information (PAI) as described in the applicant's copending application Ser. No. 07/883,868 entitled "Computer System Security Method and Apparatus Having Program Authorization Information Data Structures" which application is expressly incorporated herein by reference. In accordance with the exemplary implementation of the present invention, a program may be run on terminals A to N unless it is authorized in accordance with associated PAI. The PAI information is utilized to protect programs from being tampered with. Data encryption in accordance with conventional techniques is used to protect the confidentially of the data operated on by the program. The present invention is used to protect the data files from being tampered with. Particularly, when used in concert, a highly secure workstation results which may be reliably utilized in electronic commerce.

If a terminal A is a lap top computer protected in accordance with this methodology, the terminal may be carried anywhere and even utilized to operate programs which may contain a virus. The protected portion of the memory space in accordance with this methodology described below will be immune to such tampered program and the user can have a very high degree of assurance in the data processed in, stored on, and transmitted from the computer system.

Figure 2:
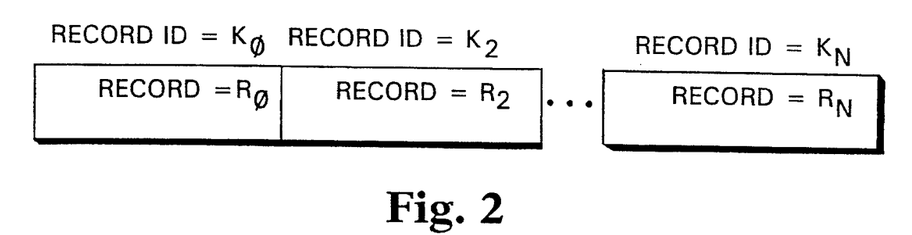
FIG. 2 generally shows an exemplary record format in accordance with the illustrative embodiment of the present invention.

FIG. 2 shows in simplified fashion, an exemplary record format in accordance with the illustrative embodiment of the present invention. As shown in FIG. 2, the file contains n discrete records $R_i$ (where, i varies from 1 to n). Each record, $R_i$ has an associated record identifier, e.g., "$K_i$" which may be a record number. $K_i$ may be any indexing value such as, for example, an employee number. Thus, the file may be organized as a sequential file (beginning with a record 1, followed by a record 2, to record n). The record identifiers may be sector numbers on a disk. The record identifiers may be organized in any associative manner (e.g., by employee number, etc.) as long as each record is uniformly and consistently identified. In addition to a record identifier $K_i$, each record is associated with a data together with conventional media control signals as will be appreciated by those skilled in the art.

As used herein, the interpretation of record can vary depending upon the application or the computer system being used. It might be appropriate to treat each byte as a record. By operating on each byte it is possible to always keep a perfect hash of the entire file. On disks which are so organized, each sector could be considered a record. In some systems, such as S/360 architecture systems, there are discrete records that can be defined in assorted ways, including sequential numbering. In some data base systems, records are best distinguished by $K_i$ being a data key—the value of which is used to identify a particular record.

Of course, this exemplary embodiment should be taken as only one possible way to implement the invention. Other techniques could include using only a partial amount of the data, or using a hash of aspects of some particular data instead of data itself, or by construing data records as combinations of raw data and or the hash values of yet other data.

In accordance with an exemplary embodiment of this invention, the data structures described below insure that the file is always recoverable in light of normal interruptions (no matter how the system may have been interrupted when the file was being updated). Any other types of data damage, accidental or intentional, will always be detectable. If complete recoverability from all interruptions is not desired, then portions of the following logic may be removed.

The illustrative embodiment uses a data base file as well as "scratchData" and "fileHash" data structures to provide complete recoverability (from interruptions) together with absolute tamper resistance. The database File data structure contains the user's data. The scratchData data structure contains record processing information in case the system is interrupted while updates are underway.

The manner in which the scratchData file is associated with the database File depends on the implementation. For example, scratchData could be a File associated with the database file by file name—with the presence of scratchData when the database File is opened indicating that its previous usage had been interrupted and recovery was necessary. The scratchData is created afresh if it did not exist during the database file opening and is erased whenever the database File is successfully closed. This approach is illustrated by the exemplary implementation described below. Alternatively, a pool of scratchData elements could be resident in permanent storage maintained by the operating environment, and associated with active database files whenever they are opened; returned to the pool when the files are closed; and checked after a system interruption to cleanup any updates underway.

If a power failure occurs during the scratchData processing then it will be recognizable that the file is inherently trustworthy. Alternatively, if a power failure occurs during file processing, then the data stored in the scratchData data structure is used to make the database File recoverable. Thus, by keeping track of what needs to be done to the file, and by performing the appropriate operation using the scratchData structure, the database File becomes essentially "bullet proof" with respect to such interruptions.

Figure 3:
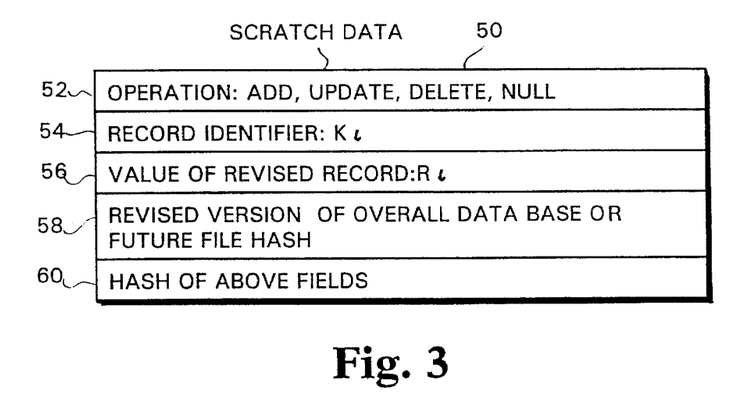
FIG. 3 is an exemplary representation of a scratchData data structure.

As shown in FIG. 3, an exemplary scratchData data structure 50 has five fields. The operation field 52 indicates either "add", "update", "delete", or "null" operations. A record identifier field 54 identifies $K_i$. Additionally, the scratchData data structure includes fields indicating value of the revised record $R_i$ (56). The revised version of the overall or future database Hash (58); and the hash of the fields 52, 54, 56, and 58 (60). Fields 54 and 56 are ignored for a "null"

operation and field 58 is ignored for a "delete" operation.

If any part of the scratchData itself is incorrect or damaged, either through blind vandalism, normal hardware (such as media) failure, or as the result of interruption while being written, then such is detected through a mismatch with the scratch's hash kept in field 60 of the scratchData data structure. The ScratchData data structure should be protected in a manner similar to the fileHash—lest an opponent modify it to effect a deliberate change to the database File. In the preferred implementation, all fileHash, scratchData, and databaseFile data structures are stored in a form encrypted with a key known only to the valid user(s). The records are encrypted before being written, and decrypted as they are read.

If only integrity, and not confidentiality, of the database-File is required, then the only data that needs to be encrypted is field 60 in the scratchData record and the fileHash. This insures that neither fileHash nor scratchData can be manipulated by clever opponents.

There is one further attack that needs to be considered, namely that an opponent could substitute stale data for all of the database File, scratchData and fileHash. In this case, the database is consistent and exactly reflects a former state of the database—thereby conforming to all validation checks—but reflects non-current and thereby possibly misleading data.

This threat could be addressed in several ways such as by keeping the date/time of the last update as an additional field and storing it with the fileHash data. This date/time data could then be announced to the user as part of opening the file each time. This also allows the user to deliberately restore and use an older version of the database File. It would also be possible to store the date/time of the last "open" as part of the fileHash data, and also store this in a user token (such as a SmartCard), which is invulnerable to surreptitious modification (the token might also be used to store the encryption key). If the date/time found with the fileHash disagrees with that in the user token, the user is alerted to the fact that an obsolete version of the database File is being used. If the date/time agrees, as normally is expected, then the user is allowed to proceed without being required to make a decision.

The threat also may be addressed by changing the encryption key used to hide the fileHash and scratch Data as part of the start of each open request. This ensures that each fileHash and scratchData can never be duplicated from session to session. The latest key could then be stored in an unalterable token maintained by the user.

The fileHash is stored where it can be associated with the databaseFile. It must be designed such that it cannot be surreptitiously modified by anyone other than the authorized user. This could be done several ways including being encrypted under a symmetric cipher key known only to the valid user(s); being encrypted under a public key, corresponding to a private key known by the valid user(s); or being digitally signed so that it can be verified by the valid user(s) as being trusted.

Any other technique may be employed so that the valid user(s) can trust that the fileHash value cannot be altered by an opponent. The trusted fileHash could be stored, for example in the directory entry corresponding to the file as an appendage to the file itself or in a special database that allows it to be related to the file.

In accordance with the exemplary embodiment, a hash of the database File is computed as follows. The file hash is initially set equal to an initial value (such as 0). Thereafter, the hash routine indexes over all records in the database File using all the record identifiers $K_i$ of the records $R_i$ 1 to N in the database file, computing this value:

$$\text{fileHash} = F(\text{fileHash}, H(K_i \& R_i))$$

The notation $K_i \& R_i$ indicates an operation that unambiguously combines the value of "$K_i$" and the value of the associated record $R_i$. One simple way to do this, if $K_i$ has a uniform length for all the keys (perhaps a binary integer padded to four bytes,) is to concatenate the two values. If the field "$K_i$" can vary in length, then the operation should be elaborated to effectively prefix the value "$K_i$" with its length indication in order to unambiguously distinguish the "$K_i$" and "$R_i$" values and then concatenate the three values such as: length $(K_i) \| K_i \| R_i$.

After $K_i$ and the content of the record $R_i$ are unambiguously combined (e.g., by concatenation), the hash of the aggregate dam string is taken using the hash function H and the result is combined with the proper aggregate fileHash value using the specialized function F. The hash function H is a one-way hash function for which it is computationally impossible to find two data values that hash to the same result. Examples of such functions include the MD5 hashing algorithm developed by MIT Professor Dr. Rivest or the secure hash algorithm (SHA).

The function F is a commutative and associative function which has an associated inverse function "Finv" and which provides a mechanism for combining the aggregate hash and the hash of updated records. Examples of such commutative and associative functions include exclusive OR (XOR) and arithmetic addition. After the application of the function F, the aggregate hash becomes the hash for all the old records including the new record. This processing is done for all the records in the database File. In the case where records are best distinguished by an index data key, that is the value $K_i$ which is used to identify a particular record, the processing loop described above is taken over all active indexing entries.

When a record identified by $K_i$ is updated (where $R_i$ is the old record and $R2_i$ is the new record value), then the new revised database File hash is recomputed as:

$$\text{fileHash} = F(\textit{Finv} (\text{fileHash}, H(K_i \& R_i)), H (K_i \& R2_i))$$

In other words, the hash of the former record is removed and the newly computed hash value is inserted. If a record identified by "$K_i$" is removed from the data base, database File hash is revised to:

$$\text{fileHash} = \textit{Finv} (\text{fileHash}, H(K_i \& R_i)).$$

If a new record identified by $K_i$ is introduced, then the revised hash becomes:

$$\text{fileHash} = F(\text{fileHash}, H(K_i i \& R_i)).$$

With this protocol, the revised hash can be computed as modified and stored.

Figure 4:
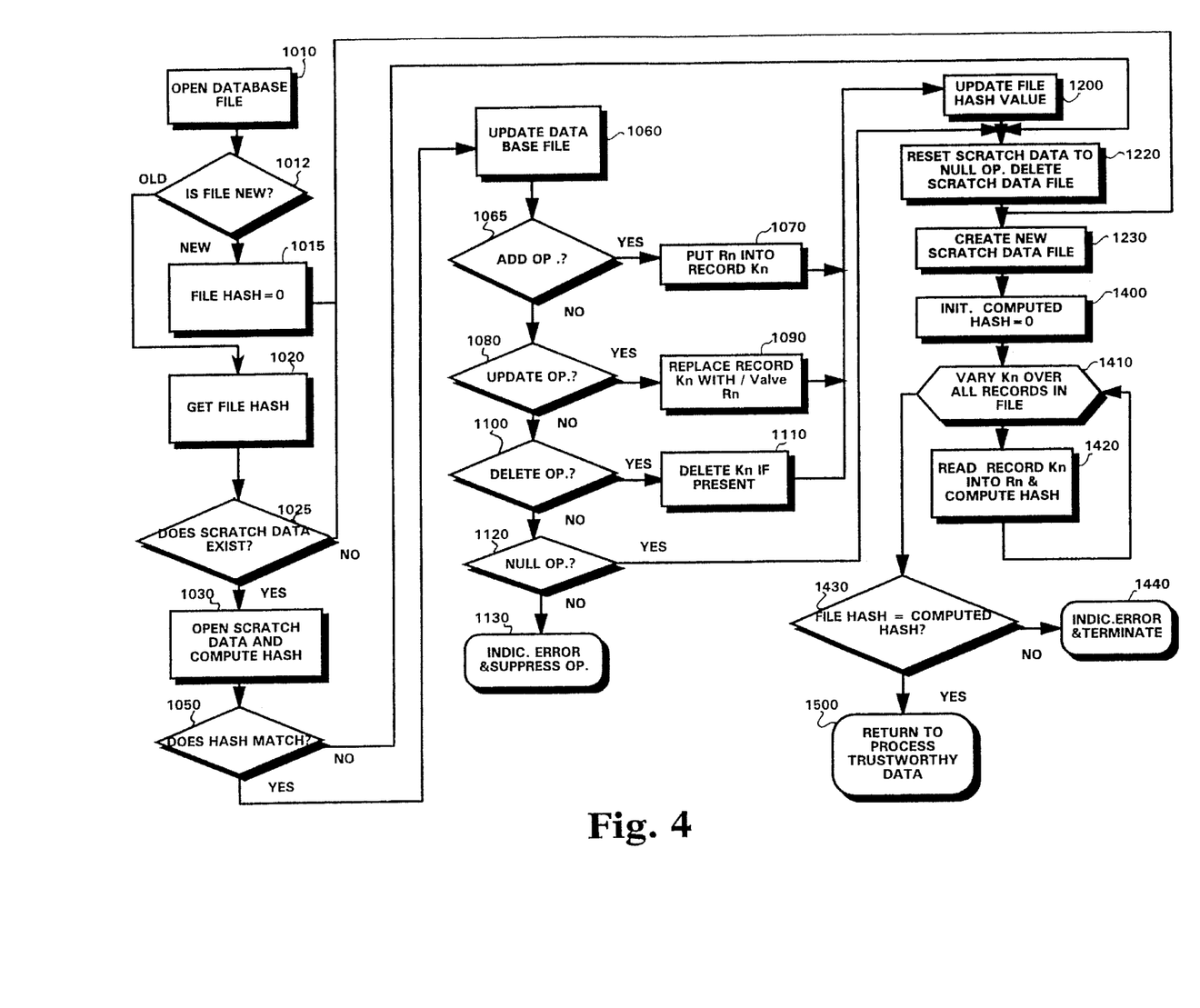
FIG. 4 is a flowchart which delineates the sequence of operations performed in accordance with an exemplary embodiment when the system opens a file to be updated or used in anyway.

FIG. 4 is a flowchart which delineates the sequence of operations when the system opens a database file (to be updated or used in any way) to establish the validity of the file. File processing begins by opening the database file (1010). A check is initially made at block 1012 to determine if the database file is being initially created or is being reinitialized (i.e., overwritten).

If the database file is a new file or is being reinitialized, the variable "fileHash" is set to 0 and the routine branches to block 1230. By initializing fileHash to 0, the stage is set for scanning through the file to insure that all records are present and contemporaneous, that none of the records have been tampered with or have been rearranged, and to ensure that the entire file in context agrees with appropriate checks. Thus, whenever a database is first utilized, the file is scanned to check the stored hash.

If the check at block 1012 indicates that the database File being processed is an old file, then the routine branches to block 1020 where the associated aggregate "fileHash" previously computed is accessed. The fileHash may be stored in a secure directory and encrypted with a key known only to the user. This value reflects the state of the file when it was last used. Exactly where the fileHash is stored depends upon the implementation. In a preferred embodiment of the present invention, the file hash may be stored in a separate data base, distinct from the file, or in an adjunct to the file's directory entry.

A check is made at block 1025 to determine whether scratchData corresponding to the database File exists. If scratchData, as shown above, in FIG. 3, does not exist for the database File, then the routine branches to block 1230.

If the check at block 1025 indicates that a scratchData data structure exists, then a process is initiated at block 1030 for handling the recovery for updates to the database files which may have been interrupted during previous processing. Initially, the scratchData data structure is opened and read. In the preferred embodiment, the scratchData file is encrypted so it must be decrypted to read its contents. A check is then made in block 1030 to insure the scratchData is itself valid by computing the hash of fields 52, 54, 56, and 58 and comparing such computed hash with the stored hash in field 60 of FIG. 3. In this fashion, it can be insured that interruptions did not occur when scratchData information was being processed.

If the computed scratchData hash does not match the stored hash in field 60 (1050), then the routine branches to block 1220 where processing for creating a new scratchData data structure begins. The mismatch of hashes implies that the scratchData data structure itself was interrupted while being written. If this is the case, the database file and fileHash should be correct and consistent, which is expected to be verified by continuing processing in block 1220.

If the scratchData hashes match, processing continues at block 1060 where database File updates which where involved in the prior processing are reapplied. Thus, the last operations that were performed on the database File are repeated using data from the scratchData data structure based on the operation designated in field 52, the record identifier of field 54, the value of the revised record from field 56 and the revised version of the overall data base hash (which is the new or future hash) in field 58 of the data structure shown in FIG. 3.

A check is then made at block 1065 to determine whether the operation indicated at field 52 of the scratchData data structure 50 is an add operation. If so, then the routine branches to block 1070 which initiates the repetition of an add operation. The value Rn (indicating the content of the revised record from field 56 of the scratchData data structure 50) is placed into the record identified by the identifier $K_n$. If the record $K_n$ exists, then it is replaced with the value $R_n$. Otherwise, if record $K_n$ does not exist, then the new $R_n$ is inserted. Thereafter, the routine branches to block 1200 where the fileHash value is updated.

If the check at block 1065 indicates that the operation is not an add operation, then a check is made to determine whether the operation is an update operation (1080). If the check at block 1080 indicates an update operation, then at block 1090, the update operation is performed by replacing the value in record $K_n$ with the value $R_n$ (the revised record data content) and the routine branches to block 1200.

If the check at block 1080 indicates that the operation is not an update operation, then a check is made at block 1100 to determine whether the operation is a delete operation. If the operation is a delete operation, the routine branches to block 1110 where a check is made to insure that the record identified by identifier $K_n$ is absent. If the record identified by $K_n$ is present, then the record is deleted and the routine branches to block 1200.

If the check at block 1100 indicates that the operation is not a delete operation, then a check is made at block 1120 to determine whether the operation is a "null" operation. A null operation is performed at the beginning and at the end of database file processing to prepare the scratchData data structure when a database file is opened and when database is closed. If the operation is a null operation, then the routine branches to block 1220 with expectation of confirming that the database File and the fileHash are both accurate and consistent. If the check at block 1120 indicates that the operation is not a null operation, then an error condition exists, and the operation is suppressed at block 1130. By reaching block 1130 it has been determined that the scratchData data structure was built incorrectly.

If the checks at blocks 1065, 1080, or 1100 indicate an add, update, or delete operation, then processing branches to block 1200 where the fileHash value is updated to reflect the latest known value after the performance of the respective operation. Thus, the fileHash value is set to what the new file hash should be after the performance of the desired operation based on the protected scratchData and the protected file data. This new fileHash value is encrypted as desired and is written into the fileHash data structure.

Processing continues at block 1220 where the scratchData field 52 is reset to the null operation. If desired, the reset scratchData is encrypted and written into scratchData 50. Thereafter, the scratchData file in its entirety is deleted.

When the routine begins processing at block 1230, the scratchData data structure has been deleted, and the associated database file has been updated. At this point in the processing, the associated database file data should be correct. In block 1230, a new scratchData database is created which is initialized to the null operation and encrypted as necessary.

After the new scratchData created, processing is initiated at block 1400 to insure that the database File is consistent with the fileHash. To begin this process, the computed Hash is set equal to zero. In block 1410, a loop is entered which steps through all the records in the database file. After all records are processed in the loop (block 1420), the routine branches to block 1430. If the data base file is just being created, then there are zero records, this loop is not executed at all, and the routine branches immediately to block 1430.

In block 1420, the value $R_n$ of the record identified by $K_n$ is read and decrypted as necessary. The computedHash is then augmented with the new record $R_n$, by computing:

$$\text{computed Hash} = F(\text{computedHash}, \text{Hash}, ((\text{length of } K_n)\|K_n\|R_n))$$

In the preferred implementation, where F and F-inverse are exclusive OR, this becomes:

$$\text{computedHash} = \text{computedHash } XOR \text{ hash } ((\text{length of } K_n)\|K_n\|R_n).$$

The routine branches back to block 1410 until all records are processed exactly once.

After all records are processed, a check is made at block 1430 to determine whether the new "fileHash" is equal to the "computedHash". If the hashes match, the database file is valid, consistent and untampered, and the routine returns to the main routine where the trustworthy data is then processed. Alternatively, if the hashes do not match, at least one of the database file, fileHash or scratchData has been damaged or tampered with in some way. This error condition is indicated to the user or the application program (1440) whereupon the application is terminated, or depending on the embodiment, the user may be allowed to determine whether to terminate processing or continue processing at his or her own risk.

Figure 5:
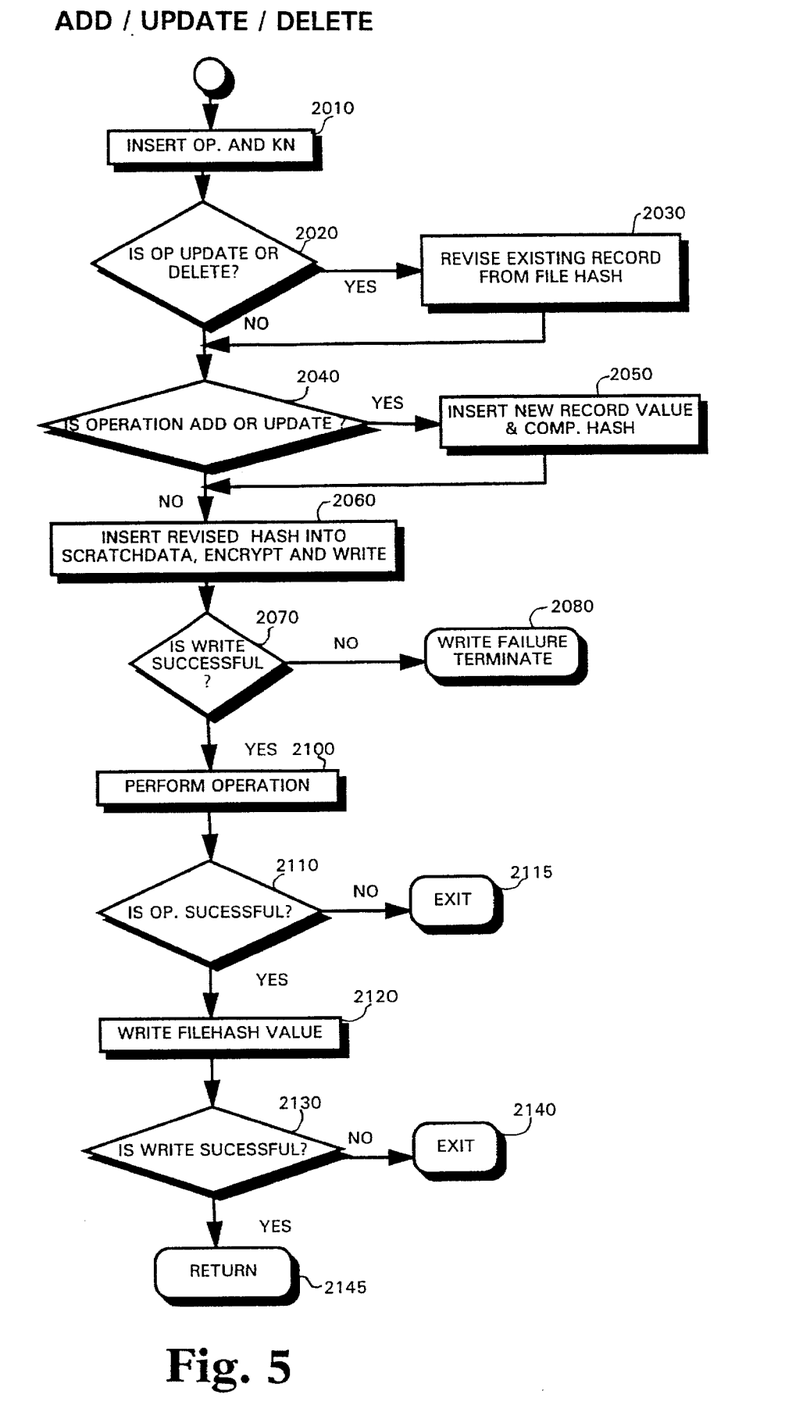
FIG. 5 is a flowchart which delineates the sequence of operations performed in accordance with an exemplary embodiment when executing an add, update or delete operation.

FIG. 5 is a flowchart which delineates the sequence of operations in performing an add, update, or delete operation. The routine shown in FIG. 5 is thus executed if the indicated operation is either an add, update or delete operation. The nomenclature described below assumes that the operation is on record $K_n$ and that for add and update operations, $NewR_n$ is the value of the record $K_n$ to be inserted. The nomenclature below assumes that for update and delete operations $OldR_n$ is the current value of record $K_n$ when the operations starts. Thus, the two variables identified below are for add and update operations. "$NewR_n$," which represents the new value of the record $K_n$ to be inserted and for update and delete operations, "$OldR_n$," which is the current value of record $K_n$ when the operation starts.

At block 2010, the processing begins by preparing to compose a new scratchData data structure by inserting the relevant operation (add, update or delete) in field 52 and inserting the record identifier $K_n$ (including its length) in field 54 of FIG. 3. A check is made at block 2020 to determine whether the operation is update or delete. If the operation is update or delete (so that an old record is being replaced), then at block 2030, the hash of the aggregate file is computed subtracting out the old record. To remove the old record from the overall hash, the function Finv is utilized as follows:

$$fileHash = Finv \text{ (fileHash, Hash (length of } K_n \| K_n \| oldR_n\text{))}.$$

In the preferred implementation where F and Finv are exclusive (XOR) this becomes:

$$fileHash = fileHash \; XOR \; \text{Hash (length of } K_n \| K_n \| oldR_n\text{)}$$

If a delete operation is indicated, then dummy fields 54 and 56 are inserted for the value of the revised record since there is no such value.

If the operation is not update or delete (or after the re-computation of the hash of the existing record in block 2030), control reaches block 2040 where a check is made to determine if the operation is add or update. If the operation is add or update, then the routine branches to block 2050 wherein a new record is processed such that the new record is inserted in the scratchData data structure field 56 and the proposed revised record $NewR_n$ is incorporated into the overall fileHash using:

$$fileHash = F(fileHash, \text{hash (length of } K_n \| K_n \| newR_n\text{)})$$

In the preferred implementation where $F_n$ and Finv are exclusive OR, this becomes:

$$fileHash = fileHash \; XOR \; \text{Hash (length of } K_n \| K_n \| newR_n\text{)}.$$

If the operation is not add or update (or after the processing at block 2050), the revised fileHash of the overall dam base is inserted into field 58 of the scratchData dam structure 50 (2060). The hash of the concatenation of the newly proposed scratchData fields 52, 54, 56, and 58 are calculated and inserted into field 60 of scratchData data structure 50. The new scratchData is written into the scratchData data structure after encrypting such data if necessary. At least field 60 in the scratchData should be encrypted for protection.

A check is made at 2070 to determine whether the write of such information onto, for example, disk memory was successful. If the write fails, the routine branches to block 2080. Otherwise continue with block 2100.

Even in the case of error, at this point in the processing of the database file, the fileHash should be intact and consistent and future recovery will yield a correct data because if the scratchData was not actually written at all, then recovery will see the last update and re-store the database File to its current state. If the scratch data was partially or faultily written, then the final Hash in field 60 will demonstrate the fault to subsequent recovery. No, action will be taken and the database File will be allowed to remain in its current (correct) condition. If the scratchData was actually written as desired, then the recovery will see a correct record and apply the latest changes as intended. The update is then terminated.

If the check at block 2070 indicates that the write was successful, then the intended update operation (e.g., add, update, delete) is performed at block 2100. A check is then made at block 2110 to determine whether the operation was successfully performed. The operation may tail for a variety of reasons (including, for example, termination of power by the user). In any case, during the recovery process the operation will be reattempted. In the exemplary embodiment, the routine exits the current add, update or delete routine (2115) and presents the error to the caller.

If the operation was successful, then updated fileHash value is written and encrypted (2120). Once the fileHash value has been successfully written, as determined by the check at block 2 130, then the routine returns with an indication that the database File modification was successful (2145). If the write was not successful, as indicated by the check at block 2130, then the routine branches to block 2140 where the routine exits with an error. Any future recovery attempts will repeat the work performed in an attempt to correctly set the fileHash. While the exemplary embodiment described in conjunction with FIGS. 4 and 5 relate to handling only a single record and a single operation at a time, as will be appreciated by those skilled in the art, it could be extended to handled multiple records.

Figure 6:
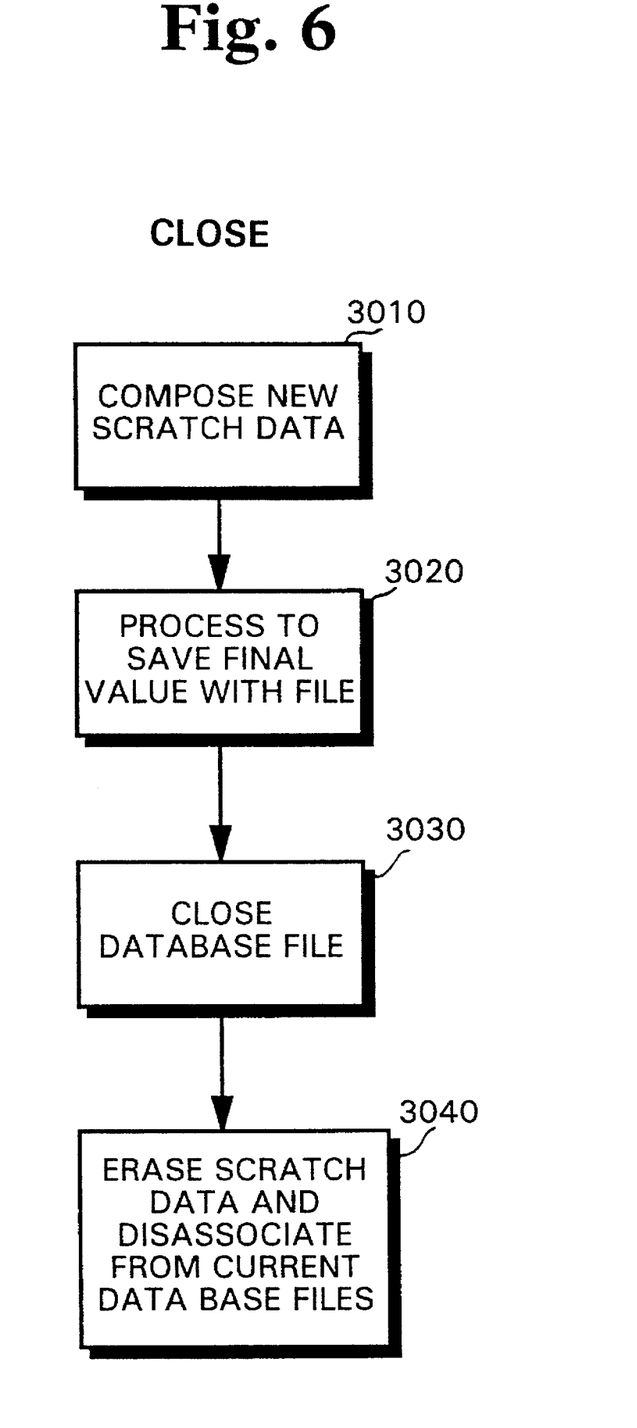
FIG. 6 is a flowchart which delineates the sequence of operations performed in accordance with an exemplary embodiment for a closure operation.

FIG. 6 is a flowchart which delineates the sequence of operations involved in closure operations. As indicated at block 3010, a new final scratchData data structure 50 is composed, where a null operation indication is inserted into field 52 and dummy fields are inserted into fields 54 and 56. The final fileHash is inserted in field 58, and the scratchData of the concatenation of the newly composed scratchData fields 52, 54, 56, and 58. This hash is then inserted into scratchData structure field 60. The final scratchData data structure is encrypted as appropriate and written to memory. Processing steps are then performed to insure that the final fileHash value with the file is saved such as by moving it into the file directory or other secure area (3020). Thereafter, the database file is closed (3030) and the scratchData file data structure is erased or otherwise disassociated from the current database file (3040).

The illustrative embodiment provides full file integrity while avoiding the prior problems mentioned above. Full integrity is achieved with the modest extra overhead of storing one hash value associated with each file in a system file directory (in some environments, the entire hard drive could be considered as a file), or in a special security database; additional processing when each file is first accessed ("opened") to scan the entire file and recompute the hash in order to verify it with the stored hash; additional working memory to store the hash for files which are in use at any particular moment; additional processing when any record is added, updated, or removed—to compute the revised hash, and re-write this hash for the file.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for protecting a collection of a plurality of discrete data units which are modified from time to time by an associated data processing system comprising the steps of:

obtaining an individual hash value for each of the discrete data units by performing a hash operation using at least the data value portion of the data unit which is to be protected; and aggregating said individual hash values into an aggregate hash value for said collection using a function which permits the independent inclusion and deletion of each individual hash value from the aggregate hash value, further including the step of including as part of the data to be hashed for each data unit, indicia which distinguishes the relative order of each data unit from the other data units, wherein said indicia is one of a plurality of sequentially ordered data unit numbers.

2. A method for protecting a collection of a plurality of discrete data units which are modified from time to time by an associated data processing system comprising the steps of:

obtaining an individual hash value for each of the discrete data units by performing a hash operation using at least the data value portion of the data unit which is to be protected;

aggregating said individual hash values into an aggregate hash value for said collection using a function which permits the independent inclusion and deletion of each individual hash value from the aggregate hash value;

associating a data structure with at least one of said discrete data units containing information regarding the data unit for use if the data processing system is interrupted while updates are underway; and providing said data structure with a field for identifying an updating operation to be performed.

3. A method for protecting a collection of a plurality of discrete data units which are modified from time to time by an associated data processing system comprising the steps of:

obtaining an individual hash value for each of the discrete data units by performing a hash operation using at least the data value portion of the data unit which is to be protected;

aggregating said individual hash values into an aggregate hash value for said collection using a function which permits the independent inclusion and deletion of each individual hash value from the aggregate hash value;

associating a data structure with at least one of said discrete data units containing information regarding the data unit for use of the data processing system is interrupted while updates are underway; and providing said data structure with a field for identifying a revised version of an aggregate hash.

4. A method for protecting a collection of a plurality of discrete data units which are modified from time to time by an associated data processing system comprising the steps of:

obtaining an individual hash value for each of the discrete data units by performing a hash operation using at least the data value portion of the data unit which is to be protected;

aggregating said individual hash values into an aggregate hash value for said collection using a function which permits the independent inclusion and deletion of each individual hash value from the aggregate hash value;

associating a data structure with at least one of said discrete data units containing information regarding the data unit for use if the data processing system is interrupted while updates are underway; and providing said data structure with a field for storing the hash of fields in said data structure.

5. A method for protecting a collection of a plurality of discrete data units which are modified from time to time by an associated data processing system comprising the steps of:

obtaining an individual hash value for each of the discrete data units by performing a hash operation using at least the data value portion of the data unit which is to be protected;

aggregating said individual hash values into an aggregate hash value for said collection using a function which permits the independent inclusion and deletion of each individual hash value from the aggregate hash value;

associating a data structure with at least one of said discrete data units containing information regarding the data unit for use if the data processing system is interrupted while updates are underway; and encrypting at least part of said data structure.

6. A method for protecting a collection of individual data groups including a first data group and a second data group which are modified from time to time comprising the steps of:

performing a predetermined hash operation on the first data group and indicia identifying said first group;

performing a predetermined hash operation on the second data group and indicia identifying said second group;

combining the hashes to determine an aggregate hash for said collection using a function wherein said hash of said first group or said hash of said second group may be subsequently extracted from the aggregate hash using the inverse of said function;

associating a data structure with at least one of said first data group and said second data group, said data structure containing information regarding the respective group for use if the data processing system is interrupted; and providing said data structure with a field for identifying an updating operation to be performed.

7. A method for protecting a collection of individual data groups including a first data group and a second data group which are modified from time to time comprising the steps of:

performing a predetermined hash operation on the first data group and indicia identifying said first group;

performing a predetermined hash operation on the second data group and indicia identifying said second group;

combining the hashes to determine an aggregate hash for said collection using a function wherein said hash of said first group or said hash of said second group may be subsequently extracted from the aggregate hash using the inverse of said function;

associating a data structure with at least one of said first data group and said second data group, said data structure containing information regarding the respective group for use if the data processing system is interrupted; and providing said data structure with a field for identifying a revised version of an aggregate hash.

8. A method for protecting a collection of individual data groups including a first data group and a second data group which are modified from time to time comprising the steps of:

performing a predetermined hash operation on the first data group and indicia identifying said first group;

performing a predetermined hash operation on the second data group and indicia identifying said second group;

combining the hashes to determine an aggregate hash for said collection using a function wherein said hash of said first group or said hash of said second group may be subsequently extracted from the aggregate hash using the inverse of said function;

associating a data structure with at least one of said first data group and said second data group, said data structure containing information regarding the respective group for use if the data processing system is interrupted; and providing said data structure with a field for storing the hash of fields in said data structure.

9. A method for protecting a collection of individual data groups including a first data group and a second data group which are modified from time to time comprising the steps of:

performing a predetermined hash operation on the first data group and indicia identifying said first group;

performing a predetermined hash operation on the second data group and indicia identifying said second group;

combining the hashes to determine an aggregate hash for said collection using a function wherein said hash of said first group or said hash of said second group may be subsequently extracted from the aggregate hash using the inverse of said function;

associating a data structure with at least one of said first data group and said second data group, said data structure containing information regarding the respective group for use if the data processing system is interrupted; and encrypting at least part of said data structure.

10. A method for maintaining a validity indicator of an updatable data file including a plurality of data records and having an associated file hash comprising the steps of:

accessing said file hash;

updating one of said plurality of data records to generate an updated record;

computing an aggregate hash using the updated record by applying a function having both associative and commutative properties to the aggregate hash and the updated data record;

associating a data structure with at least one of said plurality of data records containing information regarding said one of said plurality of record for use if the data processing system is interrupted while updating said one of said plurality of data records;

providing said data structure with a field for identifying a revised version of an aggregate hash; and providing said data structure with a field for storing the hash of fields in said data structure.

11. A method of protecting a plurality of digital data records each data record including both information content and a record identifier comprising the steps of:

combining the informational content of a data record with the record identifier of said data record to determine an aggregate data string;

performing a hashing operation on said aggregate data string to determine a hash value;

applying a function having both associative and commutative properties to said hash value;

associating a data structure with at least one data record containing information regarding the data record for use if the data processing system is interrupted while an update for said data record is underway;

providing said data structure with a field of identifying a revised version of an aggregate hash for said plurality of data records; and providing said data structure with a field for storing the hash of fields in said data structure.

12. A method of protecting a plurality of digital data records each data record including both information content and a record identifier comprising the steps of:

combining the informational content of a data record with the record identifier of said data record to determine an aggregate data string;

performing a hashing operation on said aggregate data string to determine a hash value;

applying a function having both associative and commutative properties to said hash value;

associating a data structure with at least one data record containing information regarding the data record for use of the data processing system is interrupted while an update for said data record is underway;

providing said data structure with a field of identifying a revised version of an aggregate hash for said plurality of data records; and storing said aggregate hash.

13. A method of protecting a plurality of digital data records each data record including both information content and a record identifier comprising the steps of:

combining the informational content of a data record with the record identifier of said data record to determine an aggregate data string;

performing a hashing operation on said aggregate data string to determine a hash value;

applying a function having both associative and commutative properties to said hash value;

associating a data structure with at least one data record containing information regarding the data record for use if the data processing system is interrupted while an update for said data record is underway;

providing said data structure with a field of identifying a revised version of an aggregate hash for said plurality of data records; and storing said aggregate hash such that it can not be modified by anyone other than an authorized user.

* * * * *